(12) United States Patent
Gillis

(10) Patent No.: US 9,409,524 B2
(45) Date of Patent: Aug. 9, 2016

(54) NARROW SLIDING STORAGE BIN

(71) Applicant: FORD GLOBAL TECHNOLOGIES, LLC, Dearborn, MI (US)

(72) Inventor: Francis Raymond Gillis, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/574,697

(22) Filed: Dec. 18, 2014

(65) Prior Publication Data

US 2016/0176351 A1 Jun. 23, 2016

(51) Int. Cl.
*B60R 7/06* (2006.01)
*B60R 11/00* (2006.01)

(52) U.S. Cl.
CPC ........... *B60R 7/06* (2013.01); *B60R 2011/0082* (2013.01)

(58) Field of Classification Search
CPC ............ B60R 7/04; B60R 7/046; B60R 7/06; B60N 3/08; B60N 3/083
USPC .............................. 296/24.34, 37.8, 37.12, 70
See application file for complete search history.

(56) References Cited

U.S. PATENT DOCUMENTS

| | | | | |
|---|---|---|---|---|
| 3,355,232 A * | 11/1967 | Blake | ..................... | B60N 3/083 312/242 |
| 5,228,611 A | 7/1993 | Yabuya | | |
| 5,284,314 A | 2/1994 | Misaras et al. | | |
| 5,303,995 A * | 4/1994 | Kurihara | ............ | A47B 88/0477 312/319.1 |
| 5,673,891 A | 10/1997 | Fujihara et al. | | |
| 6,929,305 B2 * | 8/2005 | Park | ....................... | B60N 3/083 296/37.12 |
| 7,530,617 B2 * | 5/2009 | Kirner | ................... | B60K 37/06 296/37.12 |
| 7,568,601 B2 | 8/2009 | Kogami et al. | | |
| 8,328,265 B2 * | 12/2012 | Danz | ......................... | B60R 7/04 296/37.12 |
| 8,740,278 B1 * | 6/2014 | Mally | ...................... | B60R 7/06 296/37.12 |
| 8,857,881 B2 * | 10/2014 | Shimozaki | ............ | B60N 3/102 224/281 |
| 2002/0101091 A1 * | 8/2002 | Ito | ....................... | B60R 11/0235 296/37.12 |
| 2003/0155786 A1 * | 8/2003 | Kim | ........................ | B60R 7/04 296/24.34 |
| 2003/0197392 A1 | 10/2003 | Clark et al. | | |

(Continued)

FOREIGN PATENT DOCUMENTS

| | | |
|---|---|---|
| DE | 102007005555 A1 | 7/2008 |
| DE | 102007061043 A1 | 6/2009 |

(Continued)

OTHER PUBLICATIONS

English machine translation for DE102007005555.

(Continued)

*Primary Examiner* — Gregory Blankenship
(74) *Attorney, Agent, or Firm* — Vichit Chea; King & Schickli, PLLC

(57) ABSTRACT

A sliding storage compartment assembly for a motor vehicle includes a storage bin including parallel side rails defined on opposed sides thereof and a pair of outboard guides each defining a channel for slidably receiving a bin side rail therein. A housing slidably receives the bin. The housing includes parallel slots defined in opposed sidewalls thereof, with each slot being configured to receive a parallel channel defined in an outboard guide. Each sidewall of the housing includes a plurality of locator pins. Each outboard guide includes at least one cooperating two-way locator slot and at least one cooperating four-way locator aperture for aligning the outboard guide and the housing sidewall.

19 Claims, 7 Drawing Sheets

(56) References Cited

U.S. PATENT DOCUMENTS

| | | | |
|---|---|---|---|
| 2005/0173938 A1* | 8/2005 | Chamberlain | B60R 11/0205 296/37.1 |
| 2005/0252317 A1* | 11/2005 | Ueki | B60R 7/04 74/29 |
| 2006/0113811 A1* | 6/2006 | Tanaka | B60R 7/04 296/24.34 |
| 2007/0045366 A1* | 3/2007 | Kato | B60R 7/04 224/312 |
| 2009/0079215 A1* | 3/2009 | Shirase | E05F 1/10 296/37.12 |
| 2011/0156418 A1* | 6/2011 | Thorsell | B60R 7/04 296/24.34 |
| 2011/0169292 A1* | 7/2011 | Gayon | B60R 7/06 296/37.12 |
| 2012/0319440 A1* | 12/2012 | Andersson | B60N 2/4613 297/188.17 |
| 2013/0043698 A1* | 2/2013 | Blackmore | B60R 7/06 296/37.12 |

FOREIGN PATENT DOCUMENTS

| | | |
|---|---|---|
| JP | H07172245 A | 7/1995 |
| JP | 2013032122 A | 2/2013 |

OTHER PUBLICATIONS

English machine translation for DE102007061043.
English machine translation for JPH07172245.
English machine translation for JP2013032122.

* cited by examiner

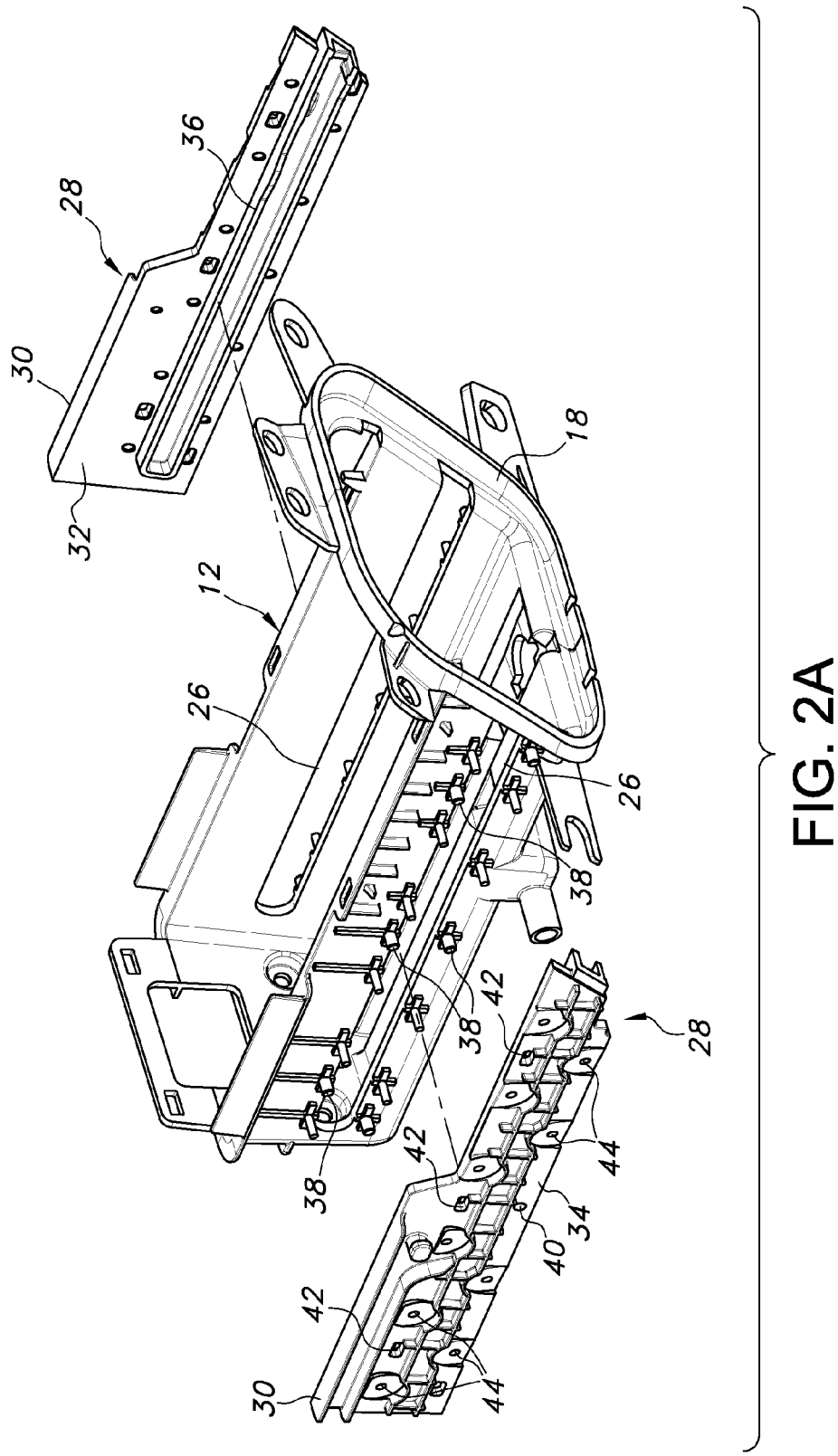

NARROW SLIDING STORAGE BIN

TECHNICAL FIELD

This disclosure relates generally to motor vehicles, and more particularly to an improved sliding storage bin design for a motor vehicle.

BACKGROUND

A wide variety of storage bins are provided in the modern motor vehicle to allow storage of items such as sunglasses, cash and/or change, credit cards, etc. For example, it is known to provide storage compartments especially designed for items such as sunglasses, wherein the storage compartments are positioned in the motor vehicle for easy retrieval of the contents by the driver when seated in the motor vehicle. Dash-mounted storage bins are highly desired by the consumer, to allow easy retrieval of such stored items while driving. However, storage space in the modern motor vehicle is at a premium, and only a finite amount of space can be devoted to dash-mounted storage bins in order to accommodate other necessary and desired components typically included in the modern motor vehicle dashboard.

To solve these and other problems, the present disclosure relates to a sliding storage bin for a motor vehicle. Advantageously, the sliding storage bin occupies minimal space in the vehicle dashboard, yet is of robust design and includes components admitting of easy assembly without warping.

SUMMARY

In accordance with the purposes and benefits described herein, a sliding storage compartment assembly for a motor vehicle is provided, including a storage bin including parallel side rails defined on opposed sides thereof and a pair of outboard guides each defining a channel for slidably receiving a bin side rail therein. A housing for the bin is provided, configured to slidably receive the bin. The housing includes parallel slots defined in opposed sidewalls thereof, with each slot being configured to receive a parallel channel defined in an outboard guide. Each sidewall of the housing includes a plurality of locator pins. Each outboard guide includes at least one cooperating two-way locator slot and at least one cooperating four-way locator aperture for aligning the outboard guide and the housing sidewall. In an embodiment, each outboard guide includes a plurality of cooperating two-way locator slots and a cooperating four-way locator aperture.

A push-pull lock mounted at a rear of the housing locks the bin in a closed position, and a resilient element provides a mechanism for displacing the bin from a closed and locked position to an at least partially open position. The assembly is secured to a portion of a motor vehicle dash panel, with the dash panel including an aperture configured for slidably receiving the storage bin therethrough.

In another aspect, an outboard guide for a sliding storage bin for a motor vehicle is provided, comprising a panel defining an exterior side and an interior side, a channel defined on the panel interior side for slidably receiving a bin side rail therein, and at least one two-way locator slot and at least one four-way locator aperture defined through a thickness of the panel for receiving cooperating pins included on a bin housing. In an embodiment, the panel includes a plurality of two-way locator slots and a four-way locator aperture. The panel is attached to the bin housing by heat-staked bosses formed on the cooperating pins after aligning the two-way locator slots and the four-way locator aperture with the cooperating bin housing pins.

In the following description, there are shown and described embodiments of the disclosed motor sliding storage bin assembly. As it should be realized, the sliding storage bin assembly is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed motor vehicle sliding storage bin assembly, and together with the description serve to explain certain principles thereof. In the drawing:

FIG. 2A shows an exploded view of a housing and outboard guides for the bin of FIG. 1;

Reference will now be made in detail to embodiments of the disclosed motor vehicle sliding storage bin assembly, examples of which are illustrated in the accompanying drawing figures.

DETAILED DESCRIPTION

Figure 1:
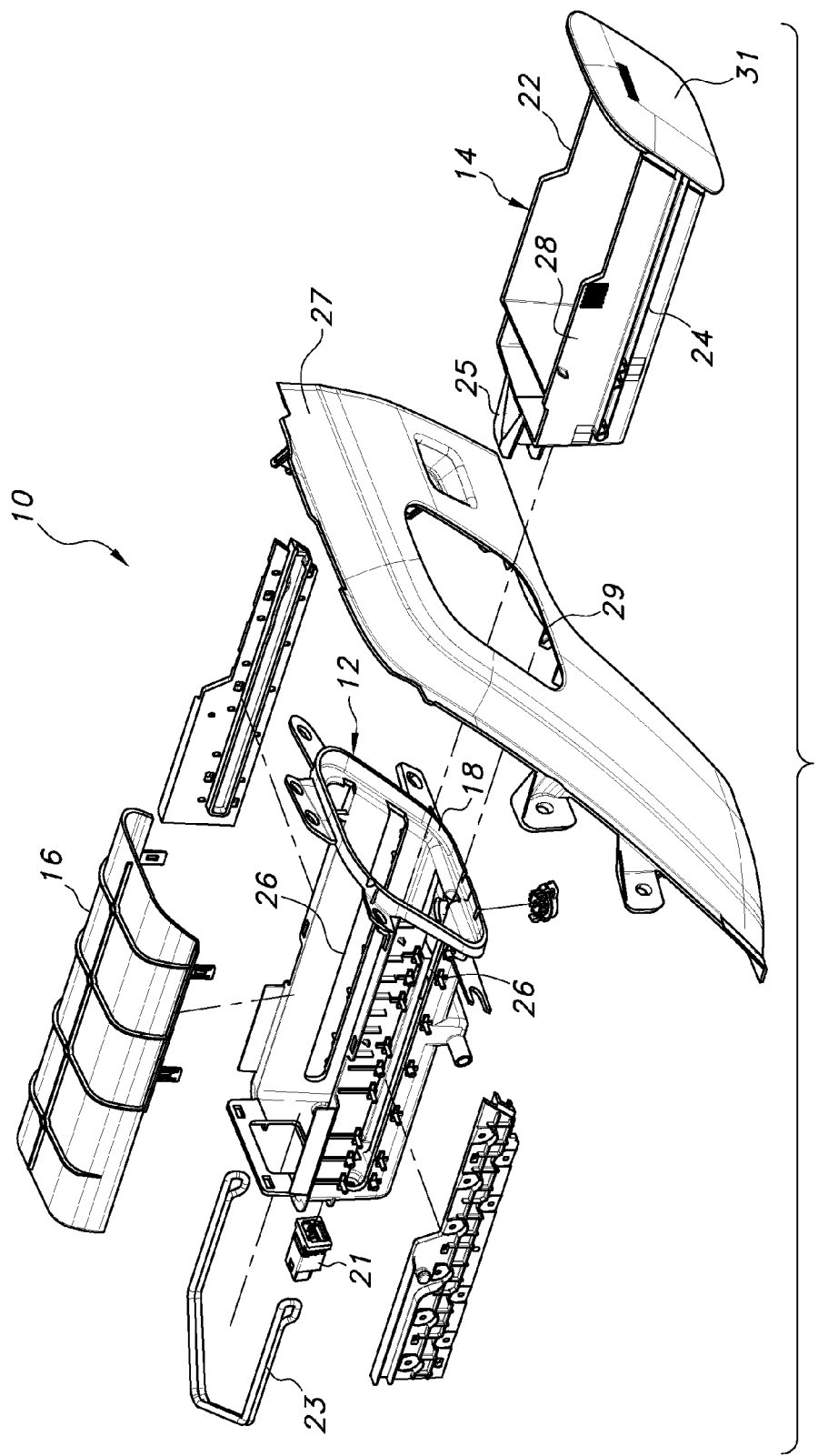
FIG. 1 is an exploded view of a motor vehicle sliding storage bin assembly according to the present disclosure.

Reference is now made to FIG. 1 illustrating a motor vehicle sliding storage bin assembly 10, being in the depicted embodiment a narrow storage bin for sunglasses and other slim items. The assembly 10 includes a housing 12 for slidably receiving a bin 14 therein. Housing 12 may include a top 16 and an open front 18. The bin 14 includes opposed sides 20, 22 each having a side rail 24 thereon. A push-pull lock 21 of a type well-known in the art was provided at a rear of housing 12 to lock bin 14 in a closed position. In turn, a resilient element 23 is included at a rear of the housing 12, to urge the bin 14 into a partially open configuration. A guide 25 was provided on a rear of bin 14, which guide 25 defines a channel for holding a portion of resilient element 23 in place. These features and their use will be discussed in greater detail below. The described assembly is attached to a rear of a portion of an automobile dash panel 27, which includes an aperture 29 dimensioned for receiving bin 14 therethrough. Bin 14 includes a front face 31 which, when bin 14 is in a closed and locked configuration, provides a substantially flush surface in dash panel 27.

Because of the narrow dimension of the bin 14 and of the corresponding housing 12 for receiving it, placing channels in an interior of the housing 12 for slidably receiving bin 14 side rails 24 was not possible due to space considerations. Therefore, slots 26 were included in the sidewalls of the housing 12 to accommodate bin 14 side rails 24. However, it was found that due to the dimensions of the slots 26 required to accommodate the bin 14 side rails 24, simply including slots 26 in the sidewalls of the housing 12 without more was impractical. This was because the dimensions of the required slots 26 created significant structural, molding, and functional issues in the assembly. On removal from a mold, it was found that the housing 12 sidewalls were not dimensionally stable and consequently lacked structure and did not properly interface with the bin 14 side rails 24.

Figure 2B:
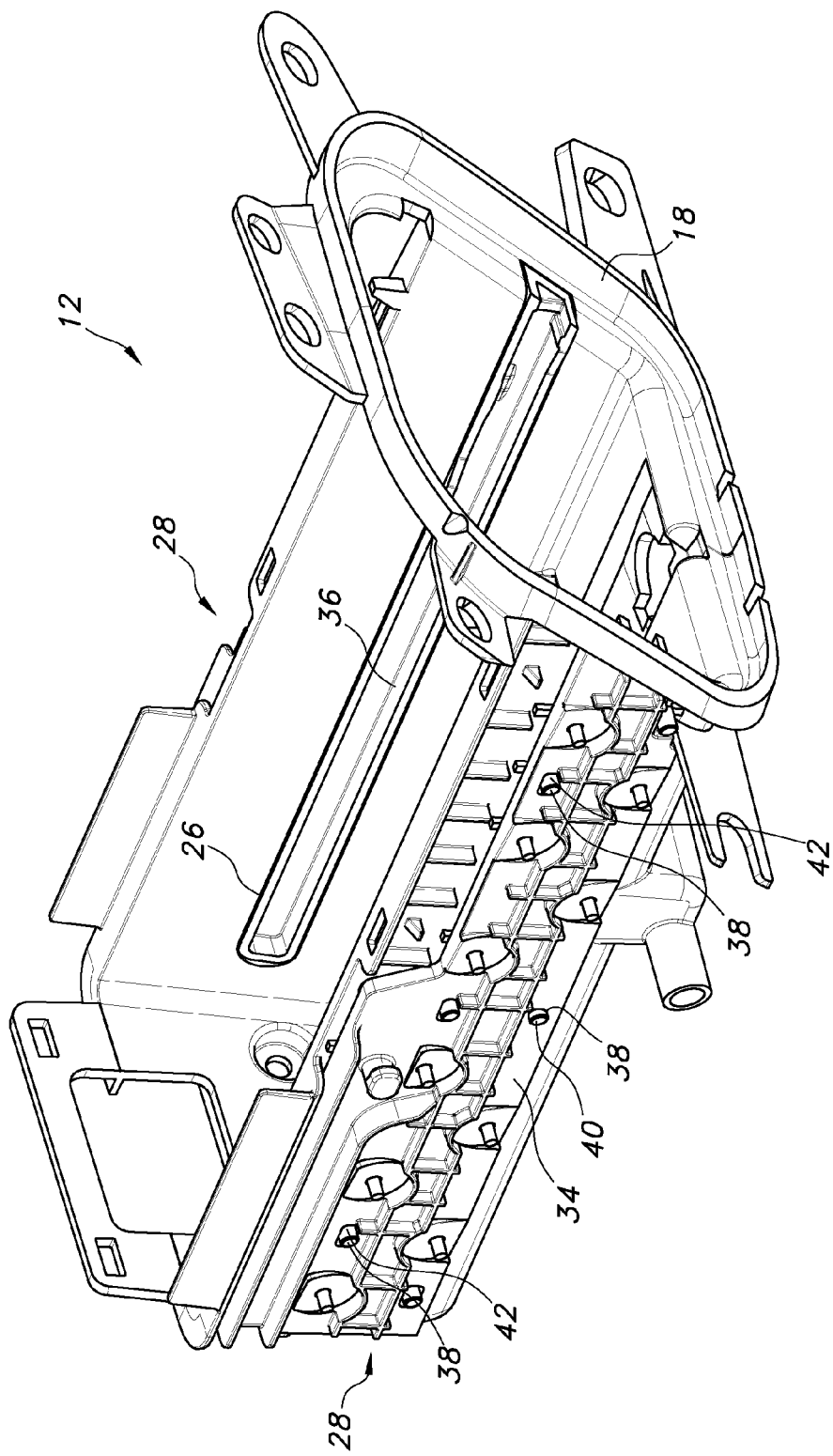
FIG. 2B shows a front perspective view of the assembled housing and outboard guides of FIG. 2A.
Figure 2C:
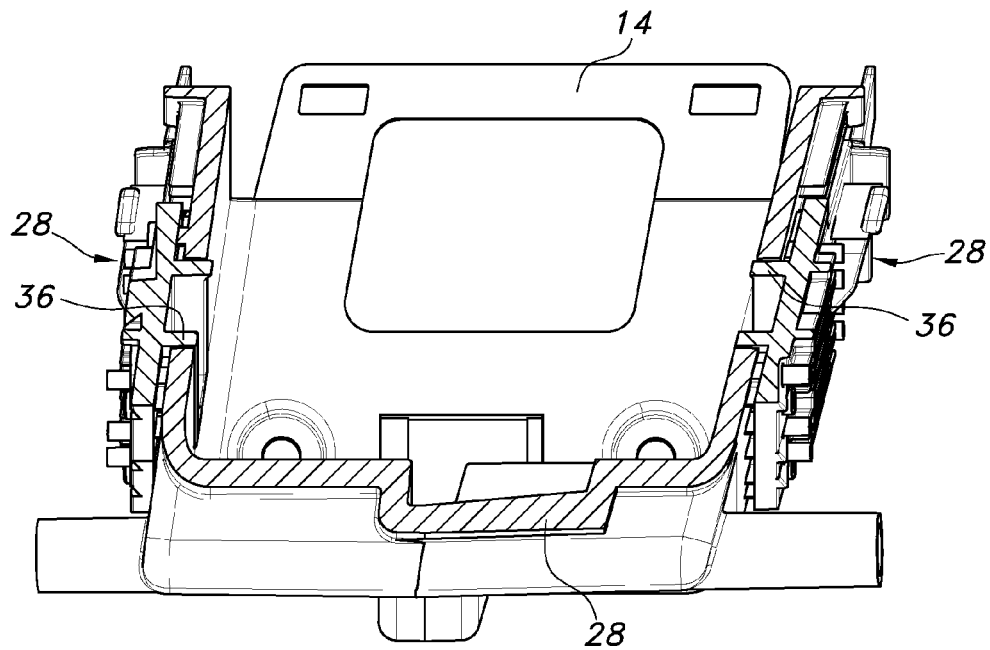
FIG. 2C shows a front view of the assembled housing and outboard guides of FIG. 2A.

To solve this problem, an outboard channel system was developed to accommodate the bin 14 rails 24. With reference to FIG. 2A, a pair of outboard guides 28 were provided, each being a panel 30 having an interior side 32 and an exterior side 34. On interior side 32, a channel 36 is provided dimensioned to slidably accept a bin 14 guide rail 24. When assembled (see FIGS. 2B and 2C), the outboard guides 28 provide the needed channels 36 by which bin 14 can be displaced between an open configuration and a closed configuration.

Because of the structural, molding, and functional issues created in the housing 12 sidewalls due to the slots 26 as discussed above, to ensure a proper alignment of the housing 12 sidewalls and the outboard guides 28, a plurality of pins 38 were defined in housing 12 during the molding process Likewise, a plurality of corresponding apertures were defined in outboard guides 38 during the molding process. Specifically, at least one four way aperture 40 and at least one two-way aperture 42 were provided through each panel 30 of outboard guide 28 (see FIGS. 2A and 3). As is known, a two-way aperture precisely locates a part in the Z direction of an X-Y-Z plane, whereas a four-way aperture precisely locates a part in the X and Z directions. Together, the four-way aperture/pin and the two-way aperture/pin constrain rotation and translation in the X-Z direction of a part, in the present case the outboard guides 28 in the housing 12 sidewalls. In the depicted embodiment, a four-way aperture/pin and several two-way aperture/pin combinations were provided, although of course alternative configurations are possible and contemplated.

Figure 3:
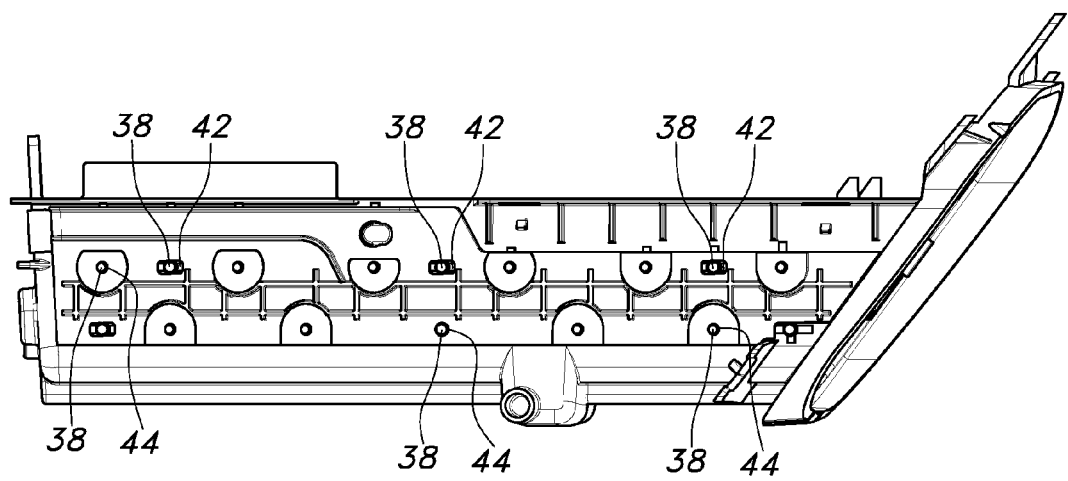
FIG. 3 shows a side view of an outboard guide panel according to the present disclosure.

Additional pins 38 were provided on housing 12 side wall for receiving in additional apertures 44 defined through outboard guide 28 panel 30 (see FIGS. 2A and 3). Then, on outboard guides 28 aligned to housing 12 by aligning the pins 38 to the corresponding cooperating apertures 40, 42, 44 as appropriate and by inserting channels 36 into slots 26. Application of suitable heat created heat-staked bosses (not shown) on pins 38, thereby completing the assembly of outboard guides 28 to housing 12. By this feature, the problem of warping out of the mold of the housing 12 created by slots 26 is solved, allowing proper alignment and tracking of the bin 14 side rails 24.

Figure 4A:
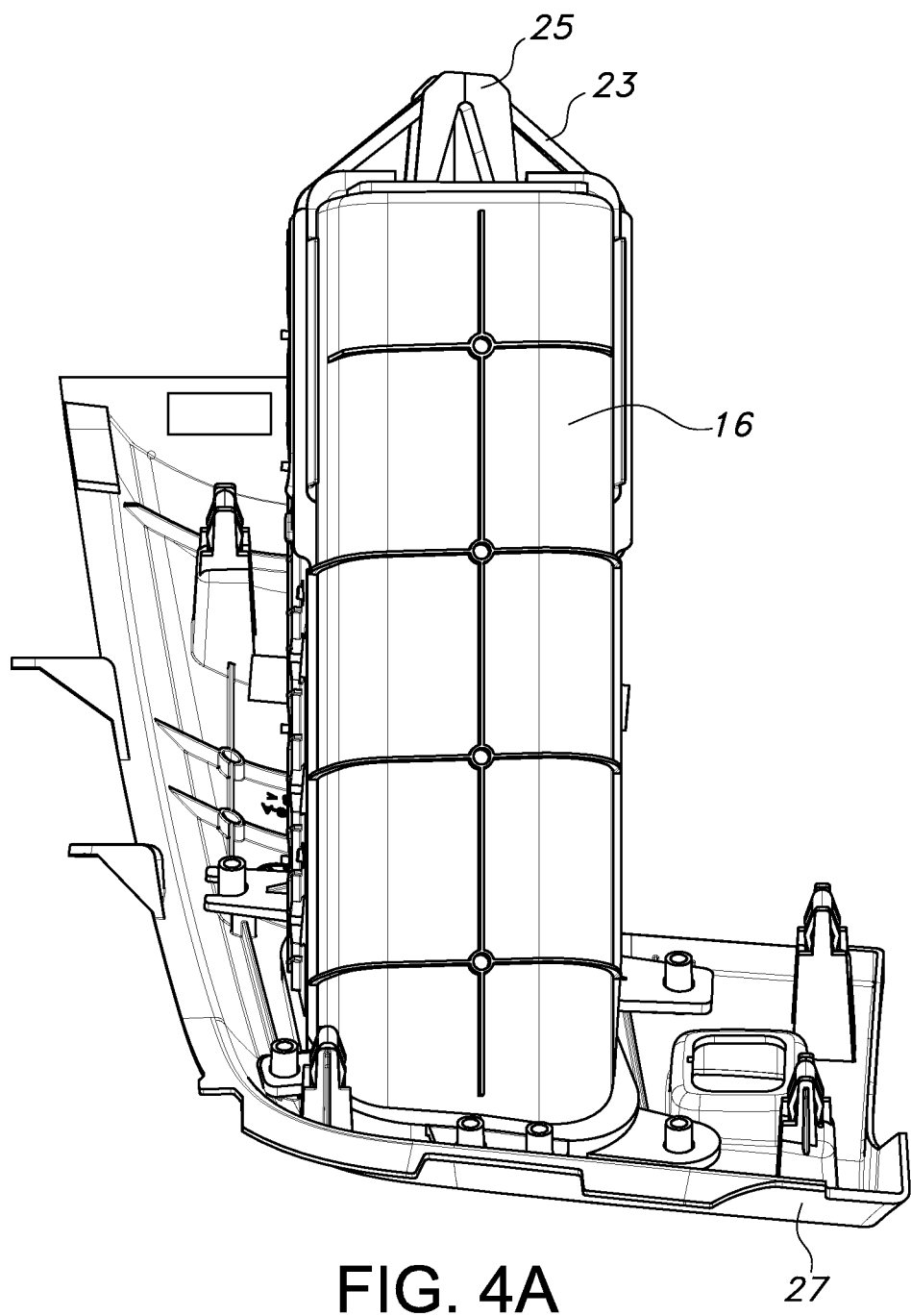
FIG. 4A shows a top view of the sliding storage bin of the present disclosure in a closed and locked configuration.
Figure 4B:
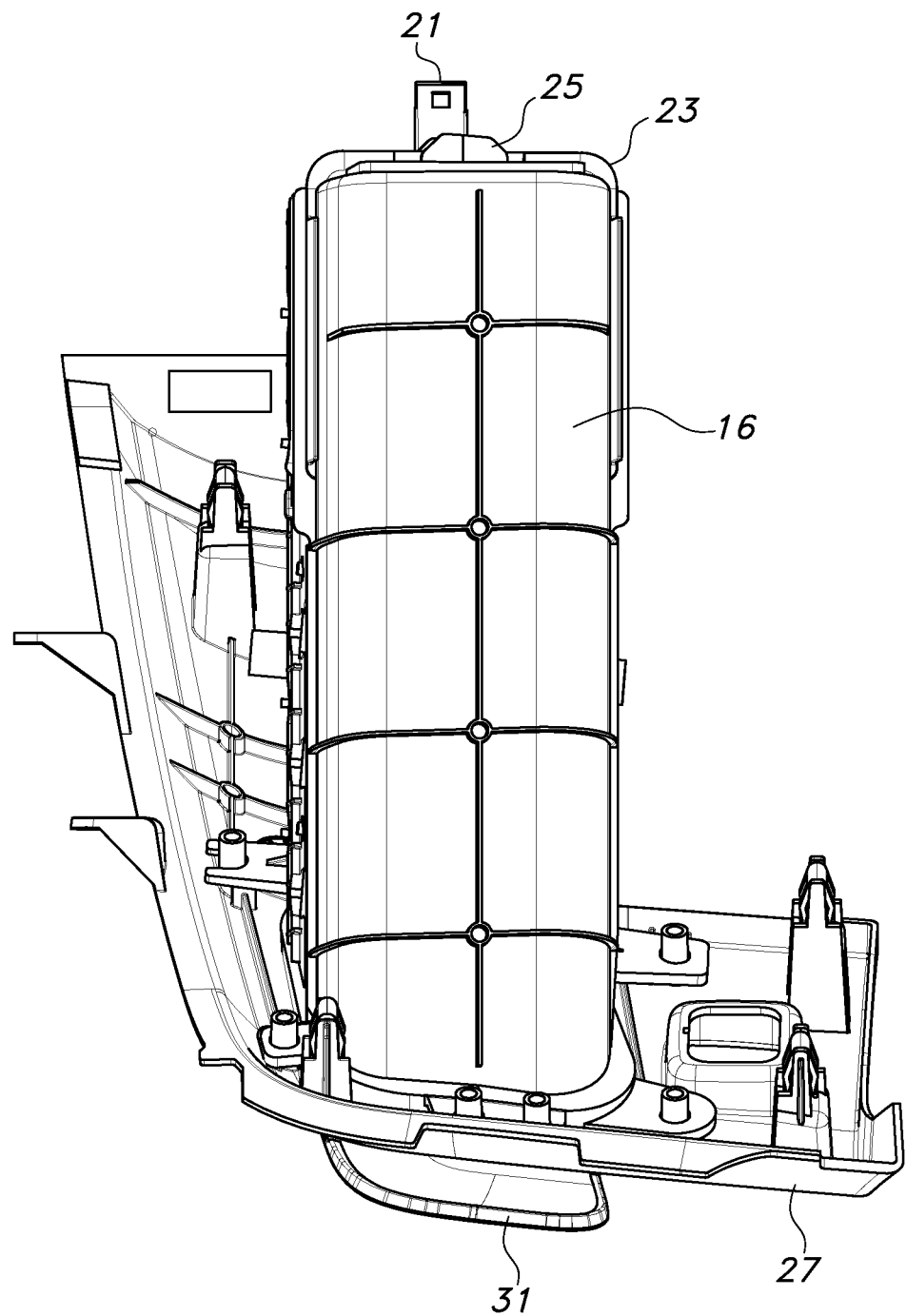
FIG. 4B shows the sliding storage bin of FIG. 4A in a partially opened configuration.
Figure 4C:
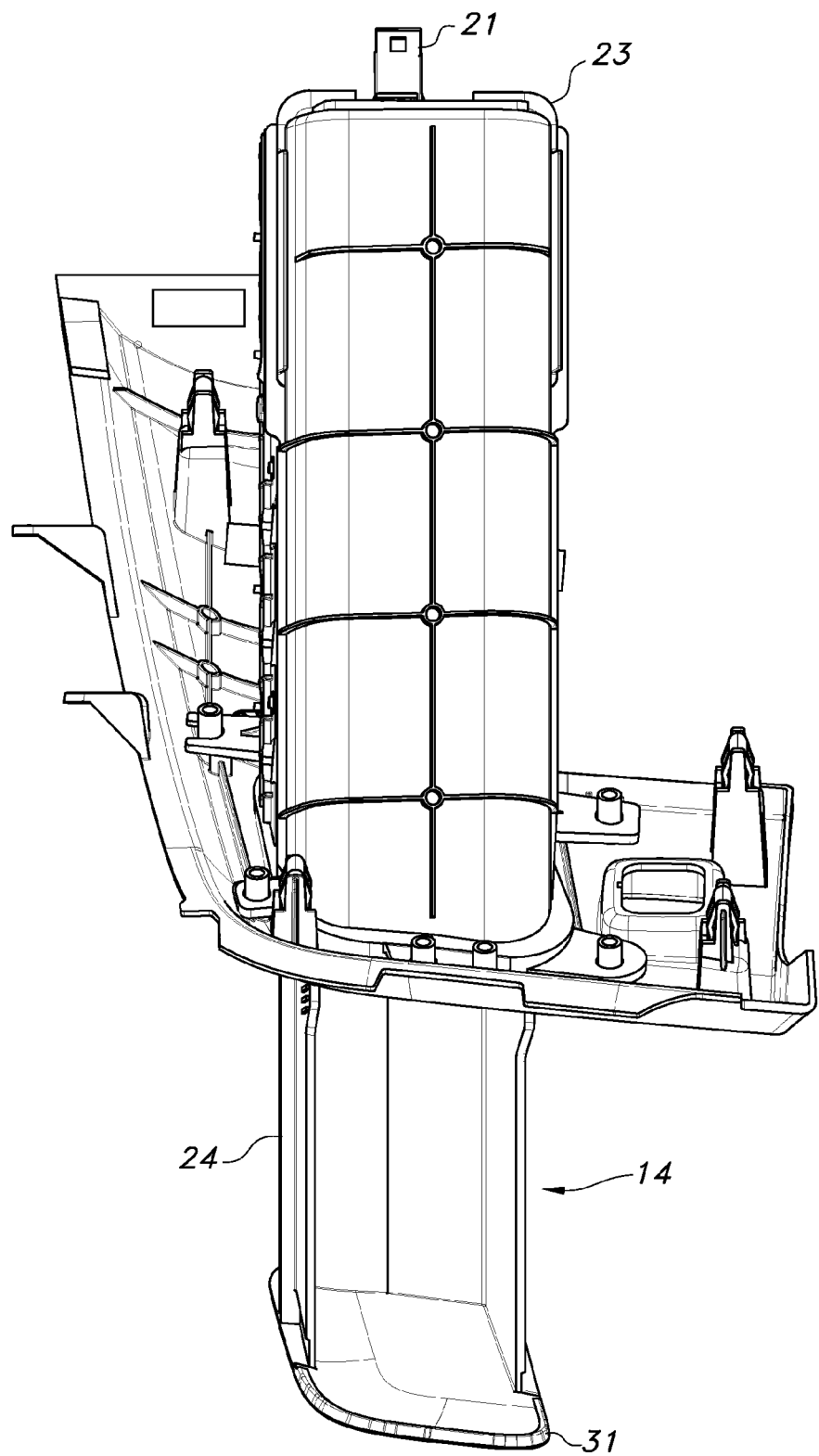
FIG. 4C shows the sliding storage bin of FIG. 4A in a fully opened configuration.

In use (see FIGS. 4A to 4C), when the bin 14 is in the closed configuration (see FIG. 4A), resilient element 23 is stretched by guide 25. A user then pushes on front face 31 of bin 14, which will cause push-pull lock 21 (not shown in this view) to release bin 14 from the locked configuration. Resilient element 23 then urges bin 14 to a partially open configuration (see FIG. 4B). A user then need only grasp bin 14 and pull it to the fully opened configuration (FIG. 4C). Reversing the process will reverse the above steps, returning the bin 14 to the closed and locked configuration.

Obvious modifications and variations are possible in light of the above teachings. For example, the disclosed embodiment of resilient element 23 depicts a resilient band, such as a silicone or other resilient material band. However, the skilled artisan will appreciate that any suitable resilient element could be adapted for use as described above, such as a compression spring for biasing bin 14 to the partially opened configuration as described above. Likewise, alternative means for locking bin 14 in the closed configuration are known and are contemplated for use herein. All such modifications and variations are within the scope of the appended claims when interpreted in accordance with the breadth to which they are fairly, legally and equitably entitled.

What is claimed:

1. A sliding storage compartment assembly for a motor vehicle, comprising:
   a storage bin including parallel side rails defined on opposed sides thereof;
   a housing configured to slidably receive the bin, the housing including parallel slots defined in opposed sidewalls thereof with each slot being configured to receive a cooperating outboard guide channel therein; and
   a pair of housing-exterior outboard guides each defining a channel for slidably receiving a bin side rail therein.

2. The storage compartment assembly of claim 1, wherein each sidewall of the housing includes a plurality of locator pins.

3. The storage compartment assembly of claim 2, wherein each outboard guide includes at least one cooperating two-way locator slot and at least one cooperating four-way locator aperture for aligning the outboard guide and the housing sidewall.

4. The storage compartment assembly of claim 3, wherein each outboard guide includes a plurality of cooperating two-way locator slots and a cooperating four-way locator aperture.

5. The storage compartment assembly of claim 1, further including a push-pull lock mounted at a rear of the housing.

6. The storage compartment assembly of claim 5, further including a resilient element for displacing the bin from a closed and locked position to an at least partially open position.

7. The storage compartment assembly of claim 6, wherein the resilient element is a silicone band for urging the bin to the at least partially open position.

8. A motor vehicle including the sliding storage compartment assembly of claim 1.

9. A sliding storage compartment assembly for a motor vehicle, comprising:
   a storage bin including parallel side rails defined on opposed sides thereof;
   a pair of housing-outboard guides each defining a channel for slidably receiving a bin side rail therein;
   a housing configured to slidably receive the bin, the housing including parallel slots defined in opposed sidewalls thereof with each slot being configured to receive a cooperating housing-outboard guide channel therein; and
   a motor vehicle dash panel for attaching to the housing, the dash panel including an aperture configured for slidably receiving the storage bin therethrough.

10. The storage compartment assembly of claim 9, wherein each sidewall of the housing includes a plurality of locator pins.

11. The storage compartment assembly of claim 10, wherein each outboard guide includes at least one cooperating two-way locator slot and at least one cooperating four-way locator aperture for aligning the outboard guide and the housing sidewall.

12. The storage compartment assembly of claim 11, wherein each outboard guide includes a plurality of cooperating two-way locator slots and a cooperating four-way locator aperture.

13. The storage compartment assembly of claim 9, further including a push-pull lock mounted at a rear of the housing.

14. The storage compartment assembly of claim 13, further including a resilient element for displacing the bin from a closed and locked position to an at least partially open position.

15. The storage compartment assembly of claim 14, wherein the resilient element is a silicone band for urging the bin to the at least partially open position.

16. A motor vehicle including the sliding storage compartment assembly of claim 9.

17. An outboard guide for a sliding storage bin for a motor vehicle, comprising:
- a panel defining an exterior side and an interior side;
- a channel defined on the panel interior side for slidably receiving a bin side rail therein; and
- at least one two-way locator slot and at least one four-way locator aperture defined through a thickness of the panel for receiving cooperating pins included on a bin housing.

18. The outboard guide of claim 17, wherein the panel includes a plurality of two-way locator slots and a four-way locator aperture.

19. The outboard guide of claim 17, wherein the panel is attached to the bin housing by heat-staked bosses formed on the cooperating pins after aligning the at least one two-way locator slot and the at least one four-way locator aperture with the cooperating bin housing pins.

* * * * *